US008341222B2

(12) United States Patent
Murayama et al.

(10) Patent No.: US 8,341,222 B2
(45) Date of Patent: Dec. 25, 2012

(54) TEXT SUGGESTION FRAMEWORK WITH CLIENT AND SERVER MODEL

(75) Inventors: Takanobu Murayama, Tokyo (JP); Kenichi Morimoto, Kanagawa (JP); Chongming Ho, Yokohama (JP); Eric Norman Badger, Issaquah, WA (US); Drew Elliot Linerud, Duvall, WA (US); Kenneth R. Walters, Brier, WA (US)

(73) Assignee: Microsoft Corporation, Redmond, WA (US)

( * ) Notice: Subject to any disclaimer, the term of this patent is extended or adjusted under 35 U.S.C. 154(b) by 217 days.

(21) Appl. No.: 12/753,790

(22) Filed: Apr. 2, 2010

(65) Prior Publication Data
US 2011/0246575 A1 Oct. 6, 2011

(51) Int. Cl.
*G06F 15/16* (2006.01)

(52) U.S. Cl. .............................. 709/204; 704/10; 709/203

(58) Field of Classification Search .................. 709/204, 709/203, 205, 217–219; 715/257, 256, 533, 715/733–759; 707/737, 741, 758, 769, 966–974; 704/9, 10
See application file for complete search history.

(56) References Cited

U.S. PATENT DOCUMENTS

| 5,896,321 | A | 4/1999 | Miller et al. |
| 6,150,962 | A | 11/2000 | Rossmann |
| 6,377,965 | B1 | 4/2002 | Hachamovitch et al. |
| 6,442,541 | B1* | 8/2002 | Clark et al. ........................... 1/1 |
| 7,054,626 | B2 | 5/2006 | Rossmann |
| 7,155,683 | B1 | 12/2006 | Williams |
| 7,369,988 | B1 | 5/2008 | Thenthiruperai et al. |
| 7,496,922 | B2* | 2/2009 | Muramatsu et al. .......... 719/312 |
| 7,539,472 | B2 | 5/2009 | Sloo |
| 7,801,899 | B1* | 9/2010 | Spitkovsky ................... 707/748 |
| 2003/0023607 | A1* | 1/2003 | Phelan et al. ................. 707/100 |
| 2003/0156547 | A1* | 8/2003 | Peleg ............................. 370/252 |
| 2004/0019657 | A1* | 1/2004 | Akiyama ....................... 709/217 |
| 2006/0075120 | A1 | 4/2006 | Smit |
| 2006/0256139 | A1 | 11/2006 | Gikandi |
| 2007/0060114 | A1 | 3/2007 | Ramer |
| 2007/0233463 | A1* | 10/2007 | Sparre ............................ 704/10 |
| 2008/0109528 | A1* | 5/2008 | Knight et al. ................. 709/217 |
| 2008/0243834 | A1* | 10/2008 | Rieman et al. .................... 707/5 |
| 2009/0144051 | A1* | 6/2009 | Lee et al. ......................... 704/10 |
| 2009/0144271 | A1 | 6/2009 | Richardson |
| 2009/0210504 | A1 | 8/2009 | Shuster |
| 2011/0061017 | A1* | 3/2011 | Ullrich et al. ................. 715/780 |
| 2011/0099506 | A1* | 4/2011 | Gargi et al. ................... 715/773 |
| 2011/0208801 | A1* | 8/2011 | Thorkelsson et al. ........ 709/203 |

OTHER PUBLICATIONS

Hasselgren et al., "HMS: A Predictive Text Entry Method Using Bigrams," <http://www.cs.lth.se/Education/LTH/EDA170/Reports2003/HMS.pdf>, 7 pages, (2003).
"A Commonsense Approach to Predictive Text Entry," <http://xenia.media.mit.edu/~tstocky/pubs/Stocky_CHI04.pdf>, 4 pages, (Apr. 24, 2004).
Wikipedia, "Globally Unique Identifier," 2 pages, modified on Apr. 1, 2010 (accessed Apr. 1, 2010).
Wikipedia, "Handle (computing)," 1 page, modified on Feb. 20, 2010 (accessed Apr. 1, 2010).

* cited by examiner

*Primary Examiner* — Quang N Nguyen
*Assistant Examiner* — Ruolei Zong
(74) *Attorney, Agent, or Firm* — Klarquist Sparkman, LLP (57) ABSTRACT

A local or remote server is configured to receive requests for text and other suggestions from a plurality of client applications. The local or remote server can format requests for delivery to one or more suggestion sources along with client contexts that specify client delivery, format, or other requests associated with the suggestion request. The local or remote server selects suggestion sources based on the client requests and the client contexts, and can combine suggestions returned from multiple sources as directed by client contexts. Requests associated with different clients can be directed to different suggestion sources, and user or client accepted suggestion histories can be stored for use in providing suggestions.

17 Claims, 10 Drawing Sheets

TEXT SUGGESTION FRAMEWORK WITH CLIENT AND SERVER MODEL

BACKGROUND

Mobile phones have evolved in recent years to the point where they now have a broad range of capabilities. They are capable of placing and receiving mobile phone calls, send and receiving text messages, multimedia messages, and emails, accessing the Internet, and providing positioning services via GPS. These devices typically include sophisticated processors, key or touch pad based data entry systems, and color displays. To keep mobile devices compact, touch screen input systems or specially configured keypads are used. For example, some devices use virtual keyboards that are presented on a device display as needed, and data entry is based on touch inputs to the display screen. Other devices use reduced sized versions or adaptations of full size keyboards, while still other devices use a mapping of numeric keys (either real or virtual) into alphabetic characters based on multiple keypresses. While users have become adept at data entry in these ways, data entry for the complex range of applications available to the mobile device user remains difficult, especially for new users, and improvements are needed.

SUMMARY

Suggestion request processing methods include receiving a plurality of suggestion requests at a server and selecting at least one suggestion source responsive to one of the received suggestion requests. At least one of the received requests if forwarded to the data source, and at least one suggestion is received that is responsive to the forwarded request. In some examples, a plurality of data sources responsive to the at least one received request is selected, and at least one of the received requests if forwarded to the plurality of data sources. In further examples, the plurality of suggestion requests is queued and at least one of the plurality of requests is removed from at least one queue in response to an associated incremental request. In some examples, at least one data source is specified in the request.

In other examples, a plurality of suggestions is received in response to the forwarded request, and the suggestions are ranked based on a history of previous suggestions or previously accepted suggestions. In some particular examples, at least one received request is includes an indicator of a client associated with the received request, and the data source is selected based on the client indicator. In some representative embodiments, at least one received request includes an indicator of a field type associated with the received request, and the data source is selected based on the field type. In additional embodiments, at least one received request includes an indicator of a field type associated with the received request, wherein the field type indicator is associated with handwriting input, voice input, or text input. In further examples, at least one received request includes an indicator of a text language, and the data source is selected based on the text language.

Mobile devices include input device configured to receive user input and a processor configured to execute a client application associated with the user input and forward a suggestion request including at least a portion of the user input and an identifier associated with the client application. In some examples, the processor is configured to forward data source identifiers associated with a plurality of suggestion sources. In additional embodiments, the processor is configured to forward data weights associated with the suggestion sources. In still further examples, the processor is configured forward an input field type indicator associated with the suggestion request. In other examples, the processor is configured to receive at least one suggestion in response to the request and complete a user input based on the response. In alternative examples, the processor is configured to forward at least one of a maximum number of requested candidate suggestions and a request duration associated with a suggestion request.

In other representative embodiments, the processor is configured to forward a suggestion combination mode indicator, wherein the suggestion combination mode indicator specifies that suggestions from multiple suggestion sources are to be delivered as a merge list, a concatenated list, or as generated.

Methods include receiving a plurality of suggestion requests at a server, each of the suggestion requests associated with a client identifier. A suggestion list for at least one suggestion request is returned in association with the corresponding client identifier. In some examples, a plurality of client contexts associated with the suggestion requests is received, the suggestion list is generated based on the at least one suggestion request and a corresponding client context. In representative embodiments, the client contexts include at least one of a request duration, a field type for the suggestion, a client identifier, and a user identifier. In further examples, the suggestion list is generated based on a history of selected suggestions associated with at least one of the client or the user.

Mobile devices comprise a processor configured to execute a client application and forward a suggestion request including an identifier associated with the client application. In some examples, the processor is configured to forward data source identifiers associated with a plurality of suggestion sources and to forward data weights associated with the suggestion sources. In representative examples, the processor is configured to forward an input field type indicator associated with the suggestion request and to receive at least one suggestion in response to the request and provide the at least one suggestion to the client application. In additional examples, the processor is configured to forward at least one of a maximum number of requested candidate suggestions and a request duration associated with a suggestion request. In still further examples, the processor is configured to forward a suggestion combination mode indicator, wherein the suggestion combination mode indicator specifies that suggestions from multiple suggestion sources are to be delivered as a merge list, a concatenated list, or as generated. In typical examples, the suggestion sources are located at the mobile device, and the processor is configured to queue suggestion requests from multiple client applications on the mobile device.

The foregoing and other features and advantages of the disclosed technology will become more apparent from the following detailed description, which proceeds with reference to the accompanying drawings.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art. In other instances, well-known methods, procedures, and components have not been described in detail so as not to unnecessarily obscure aspects of the embodiments.

Figure 1:
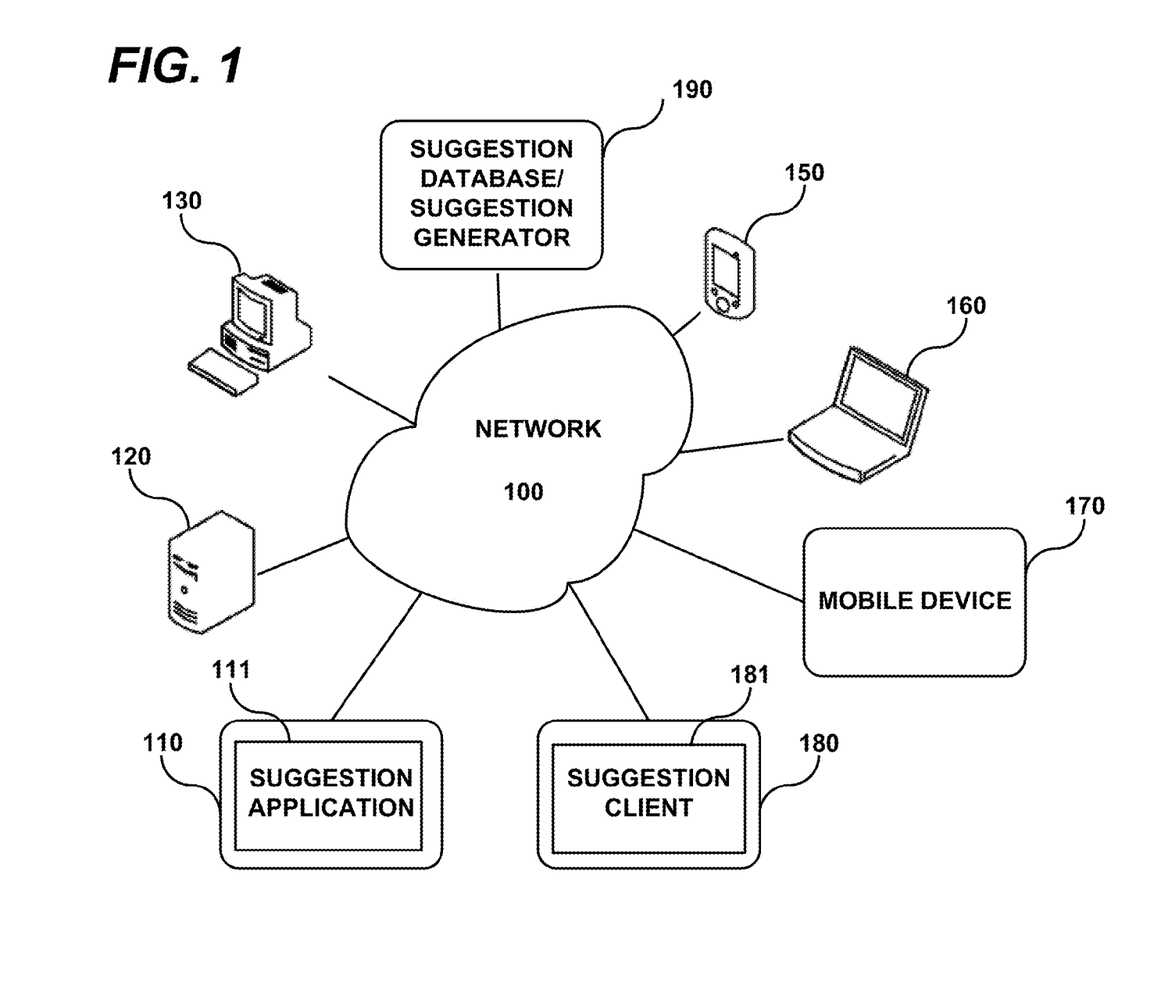
FIG. 1 illustrates an exemplary network in which a server-based suggestion system is implemented.

FIG. 1 illustrates an exemplary network 100 that can implement a mobile suggestion system. Various computing devices such as, but not limited to, a server 120, a desktop computer 130, a mobile device 150, and a laptop computer 160 are in communication with and via the network 100. A mobile device 180 is configured to execute a client application 181 that communicates with a server 110 that is configured to manage suggestion requests provided by the client application 181 with a suggestion manager application 111. Any or all of the other devices illustrated can be similarly configured to direct suggestion requests to the server 110. As shown in FIG. 1, a server 190 is configured include one or more suggestion databases or suggestion generation processors and can receive requests from the suggestion manager application 111 or from the client application 181. Additional suggestion servers can be provided but are not shown in FIG. 1.

Figure 2:
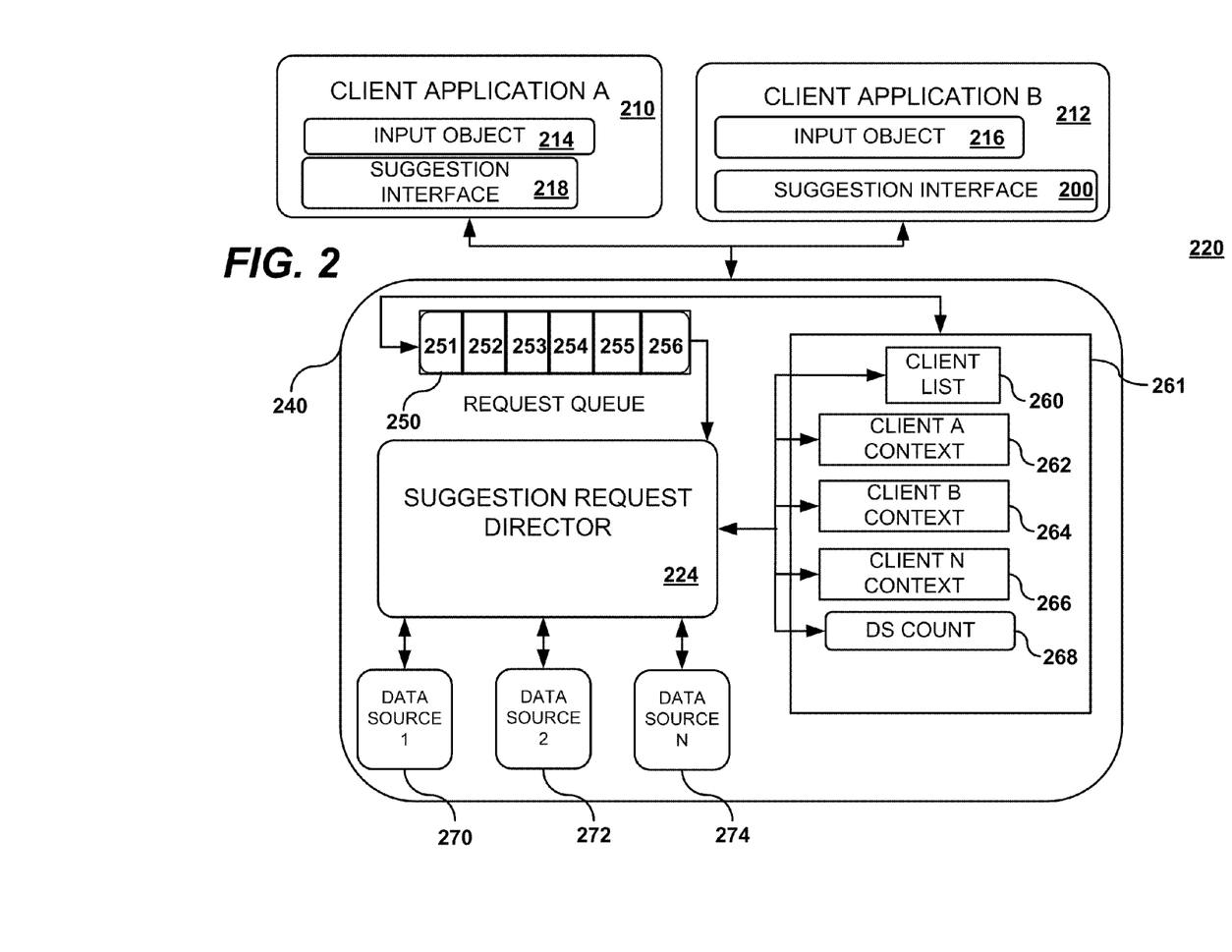
FIG. 2 illustrates an exemplary embodiment of a suggestion system in which multiple clients communicate with a suggestion manager and a plurality of networked suggestion data sources.

FIG. 2 illustrates an exemplary embodiment of a prediction system 200 that permits client applications 210, 212 to communicate with a suggestion manager 240 to request and obtain text or other suggestions responsive to user inputs at the client applications 210, 212. The client applications 210, 212 can be associated with one or more users or one or more user devices or can be on the same device. For example, first and second applications selected by a single user on her handheld communication device can communicate with the suggestion manager 240 to obtain context dependent suggestions. In other examples, the client applications 210, 212 are similar or different applications associated with different users with different user devices. As shown in FIG. 2, the suggestion manager 240 is implemented as a server that is remote from the user devices on which the client applications are executed.

The client applications 210, 212 can be implemented to include respective input objects 214, 216 and suggestion interfaces 218, 220. The input objects 214, 216 are generally based on computer-executable instructions configured to permit a user to enter text, images, audio, or other data as appropriate for a particular client application or in a particular aspect of a client application. For example, text, audio, graphics, or particular types of input such as contact information, calendar information, or web URLs can be entered. In addition, the input objects 214, 216 are in communication with the respective suggestion interfaces 218, 220 so that user inputs (including partial user inputs) can be forwarded to the suggestion manager 240, and suggestions can be directed to the client applications 210, 212, respectively. The suggestion interfaces 218, 220 are generally based on computer-executable instructions that facilitate client/suggestion manager communications. Typically, the suggestion interfaces 218, 220 can communicate one or more suggestion requests from the respective clients and receive corresponding suggestion-ready notifications, suggestions, suggestions lists, or suggestion rankings as directed by the prediction manger 240. Suggestion requests generally include or are based on user entries (including partial or incomplete entries) with the client applications 210, 212 but can also be based on an indication of a type or entry to be supplied, previous entries, entry histories, or entries or suggestions shared with other users. For example, if a client application is requesting a URL, a history list of URLs can be provided as suggestions even in the absence of any additional input by the user. The client applications 210, 212, the input objects 214, 216, and the suggestion interfaces 218, 220 are also configured to communicate identifiers associated with one or more suggestion requests, and in some examples, each suggestion request includes a unique identifier. In other examples, a unique client identifier is provided so that suggestion requests can be directed to the appropriate requesting application. The input objects 214, 216 can store previously processed request identifiers and suggestion lists associated with the identifiers in memory at a user device or in a remote memory or other computer-readable storage device.

The suggestion interfaces 216, 220 can be hosted within the client applications 210, 212, and serve to control communications in a prediction or suggestion process. For example, the client application 210 can communicate context information to a server, select preferences for data sources to be used in providing suggestions, and how suggestions are to be ranked, sent, or received. In some examples, upon notification that one or more suggestion requests are complete, the prediction interface retrieves a suggestion list and communicates how the suggestion list is to be arranged. Some client applications include character or text input, and characters and strings can be entered by a user and suggestion requests forwarded to the suggestion manager 240 based on the entered characters, and prior requests updated or discarded.

The suggestion manager 240 is in communication with the client applications 210, 212 and other applications via a wired or wireless network, or a combination thereof. The suggestion manager 240 includes a request queue 250 that arranges requests for suggestions 251-256 in a priority order for processing. The suggestion manager 240 also includes a client list 260 that includes client contexts 262, 264 for clients 210, 212, respectively, as well as client contexts for additional clients such as client context 266. A client context can include context properties such as a list of data sources, preferred data source identifiers, client identifier, a handle to post a suggestion-ready message, an incremental suggestion result, a list of non-incremental suggestion results, a list of primitives used for a suggestion, location information or other information. For example, location can be useful in obtaining suggestions for nearby businesses, streets, or attractions. Typically, context properties include a language identifier, input type identifiers, or other parameters associated with client preferences concerning suggestions.

A suggestion request director 224 is coupled to the request queue 250 and the client list 260 and is configured to direct suggestion requests to suggestion data sources 270, 272, 274 that can be available at one or more network locations. The suggestion requests 251-256 can be directed based on the client contexts 262, 264, 266 or based on a default client context. In this way, the suggestion request director 224 can select appropriate suggestion databases in response to user preferences for suggestion sources, the requesting client, manner and timing of suggestion returns, and types of suggestions. Alternatively, the contexts 262, 264, 266 can specify particular suggestion sources. The suggestion request director 224 can select the same or different suggestion data sources as appropriate for each suggestion request. In addition, the suggestion request director 224 can receive or process suggestions so as to form suggestion lists that are sorted based on suggestion priority and data source weights, or suggestion lists that are formed by concatenating suggestion lists from multiple data sources. For example, the suggestion request director 224 can forward requests for the client 210 to suggestion sources 270, 272, and receive suggestion results from just these sources. The suggestion request director 224 can combine search suggestions based on a probability estimate for each suggestion or associated with each suggestion data source, or weights assigned to the suggestion data sources. Alternatively, probabilities can be returned to a requesting client.

As shown in FIG. 2, the suggestion manager 240 can process requests from multiple client applications and the request queue 250 can hold multiple requests either from the same client or from different clients. The suggestion manager 240 can remove a queued request 248 when its requesting client application supplies a newer request with updated query information or otherwise requests cancellation of an earlier request. A data source query duration can be specified by the suggestion request director 224 to establish a time limit for query processing at a suggestion data source. In addition, such a time limit can be communicated to a suggestion data source to configure suggestion searches consistent with the time limit. For example, if a duration specified for a query expires while a data source is still generating a list, the suggestion request director 224 can instruct the data source to stop the query, and return any suggestion results that have been generated.

In some examples, a request for text suggestions includes text preceding and/or following the text for which as suggestion is sought. For instance, in trying to predict candidate suggestions for "Mew" based on the text "Happy Mew Year", a suggestion data source can be provided with the preceding and following works, in order to provide a probable work "New" as a suggestion. While preceding text can be useful for predicting during data input, following text (possibly in conjunction with preceding text) can be useful for post editing or doing a post correction phase or post highlighting phase once all text is present.

Although text suggestions are frequently of interest, the suggestion manager 240 can be configured to provide suggestions for other data types. For example, based on a client application and an associated client context, queued requests can pertain to application icons, images, audio, video, mathematical or other symbols, or combinations thereof. In addition, queries can be established for user inputs such as handwriting, voice, or other inputs.

The suggestion manager 240 can maintain a list of data source reference counts 268 that includes a data source identifier and a reference count associated with a current suggestion source availability. For example, a reference count associated with a suggestion data source can be incremented when the suggestion data source is selected by the suggestion request director 224. The reference count can be decremented by the suggestion request director 224 when the suggestion data source is no longer requested by a previously requesting client. When the reference count of a suggestion data source is 0, the suggestion data source is no longer servicing requests from the suggestion request director 224 and communication with this suggestion data source can be terminated.

Context properties can be provided to a suggestion manager and to suggestion sources. Context properties can include language identifiers, input scopes, phrase lists, or input type information (e.g. keyboard, mouse, microphone, etc). A language identifier, for example, can specify a language in which the suggestion request is made, in which a suggestion is to be returned, or both. Input scope information can be provided for a particular data input field of a client application so that suggestion queries can be for suggestions suitable for the current data input field. For example, a phrase list can be provided that limits suggestions to a list such as days of the week, months of the year, states, or the like based on the input scope information associated with client context. In another example, input history can also be restricted to history from the current input field and other fields with the same context. In this way, suggestions can be limited as appropriate for the current input field. In other examples, the client context associated with an input data field can specify a particular data source.

Context properties can also include a suggestion delivery mode indicator that can be used to arrange suggestions for delivery to a client application. Typical modes include an immediate mode in which suggestions are returned as generated, and merge and concatenate modes specifying that suggestions lists are to be combined or concatenated, respectively. A default mode can be provided specifying that suggestions are to be retrieved from one data source at a time, from the highest weight first, until the number of suggestions reaches a maximum number of suggestions specified by the client in the input query or a default maximum. Additional suggestions can be obtained from other data sources based on the number of candidate suggestions requested and the number already received. In a merge mode each enabled data source can be queried for the maximum number of candidates specified by the client. The lists can be merged together, suggestions ranked based on weighted probabilities and then reduced to the number of maximum candidates. In a concatenate mode, enabled data sources are queried for the maximum number of candidates specified by the client and the lists are concatenated. The maximum number of candidates returned is then a product of the maximum number of candidates specified by the client and the number of selected data sources.

The context can also specify a duration timer that can have priority over other specified modes. When the a duration timer expires, the data source processing the search can return control to the suggestion server with the currently collected search results and the server directed to stop request processing for the client associated with the expired duration timer.

In some embodiments, input query information can be a query type, maximum number of candidates, a candidate suggestion type, a query duration, or other information. For example, a query type can indicate a prefix match, an exact match, or the like. In one embodiment a candidate type can be a word, a phrase, a sentence, or other data types. A duration can specify a total time that one or more data sources can use to perform a query. In some embodiments, if a duration value is not specified or is zero, a query can complete without a time limitation.

Suggestion requests can be based on user data such as prefix text, handwriting strokes, audio or video data, graphical data, swipe data, touch data or other data. In some examples, a suggestion manager or a suggestion data source can return a data source identifier to a client so that a client can associate a suggestion with a source, and thus evaluate which data sources generally provide more useful suggestions.

For text entry, each character, word, phrase, sentence or other text portion entered by a user can be used to generate a suggestion request. During user data entry, new suggestion request scans be made and prior requests updated or cancelled, even prior to receiving any suggestion results. In some examples, a client request includes an indication that the request is incremental and a suggestion server can then instruct that corresponding previous requests be removed from a queue or otherwise terminated. In other embodiments, an incremental flag can be cleared when a client requires results for each suggestion request. For example, such usage can be in proofing, where each word sent to the query returns possible word correction candidates. In other examples, each character typed by a user can be use to prompt a suggestion request, and each new character used to establish an incremental request until the user accepts a suggestion or otherwise completes an entry.

Figure 3:
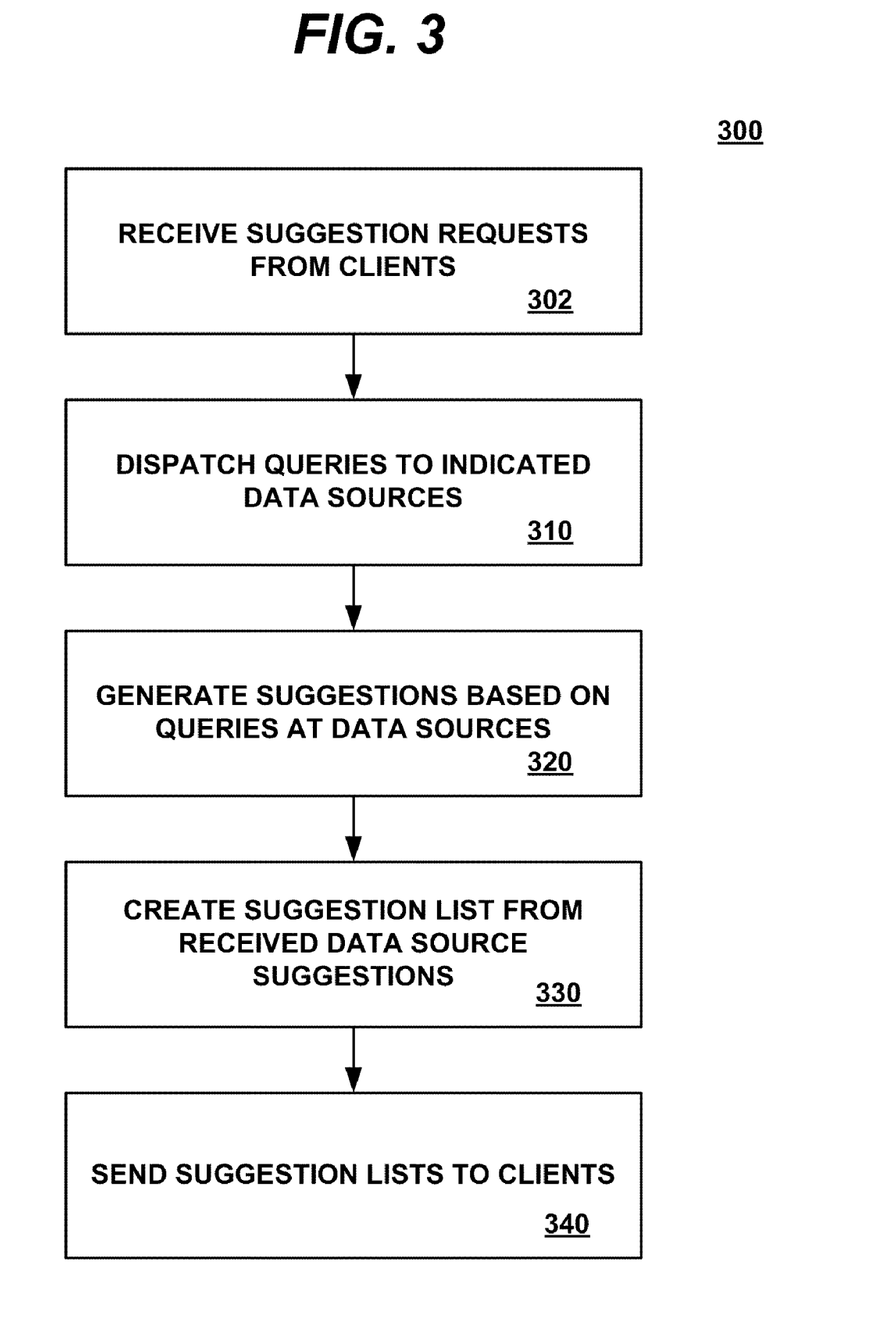
FIG. 3 illustrates a representative method of processing suggestion requests from a client.

FIG. 3 illustrates a suggestion method 300 that can be implemented on a single local or remote server, multiple local or remote servers, or with a combination of local or remote servers and local user devices. With reference to FIG. 3, the suggestion method 300 includes a step 302 in which service requests are received from one or more clients. In some examples, multiple requests are received from single client application. The received service requests can include indicators associated with suggestion data sources to be used to obtain suggestions or other indicators associated with suggestion requirements, including suggestion type and suggestion delivery times. Based on these indicators, in a step 304, queries are communicated to one or more selected suggestion data sources. A query can include input strings and additional information provided to permit selecting appropriate context-based selections. Typically, the queries are forwarded to suggestion databases that are selected based on the particular client and/or the particulars of the client request. In some examples, a client context can be forwarded to a suggestion manager or to a selected suggestion data source, and client context can be updated in response to changing client requests. In a step 306, suggestions are generated at one or more of the selected suggestion data sources, and in a step 308 suggestions from multiple suggestion data sources are combined in a single list of suggestions. In a step 310, the suggestion list (or one or more suggestions) is communicated to the client.

In addition to suggestions generated by local or remote suggestion data sources, previous suggestions accepted by a client or previously generated at a client or remotely generated can be stored at a local or remote suggestion source along with identifiers that associate the suggestion with a particular client or user. Such suggestions can be included in a suggestion history that can be cleared or edited to add or delete suggestions individually. In addition, historical suggestions can be added to a suggestion history list or omitted from such a history list as directed by a client.

Figure 4:
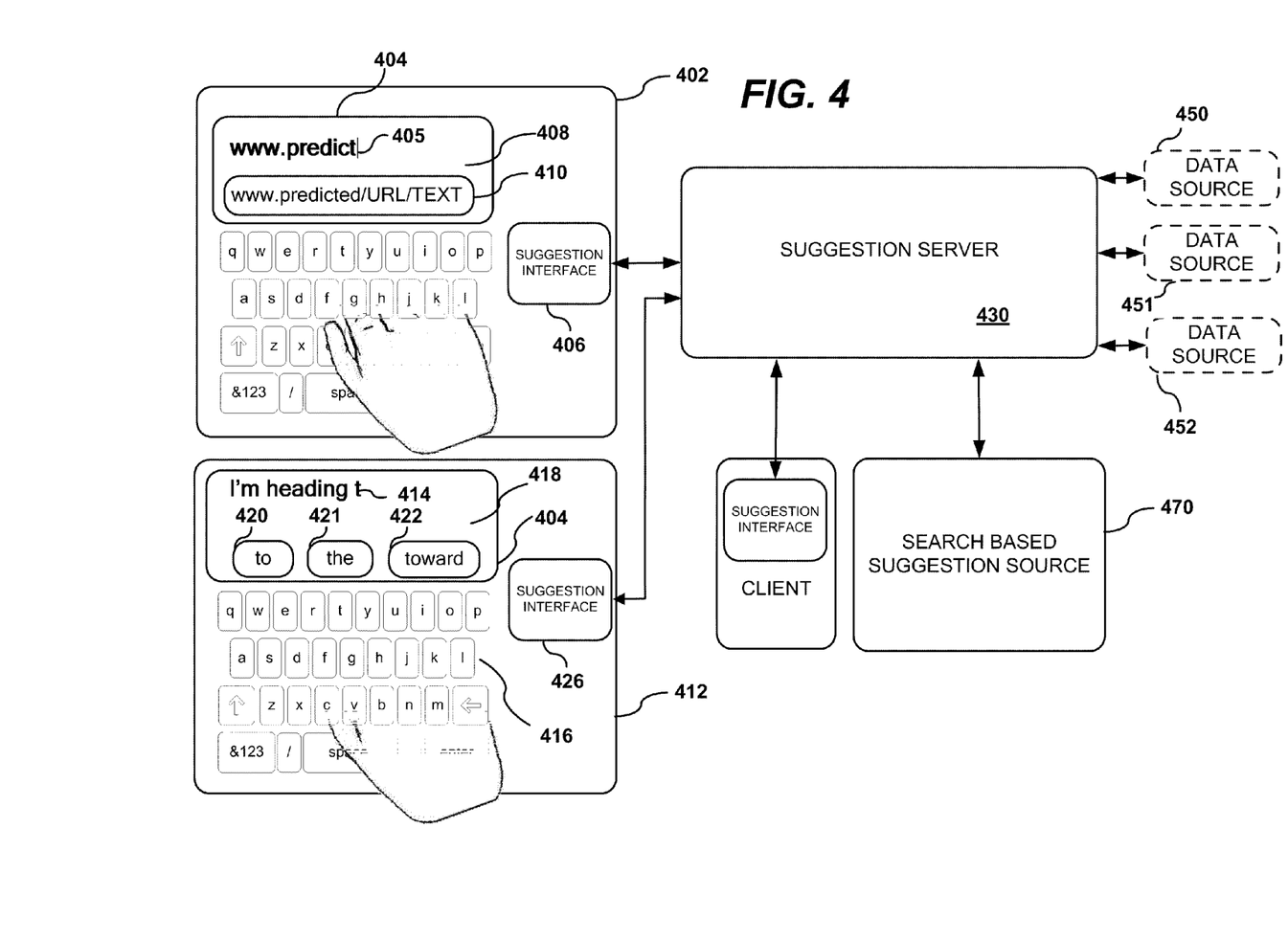
FIG. 4 illustrates two mobile devices in communication with a remote suggestion server to obtain suggestions from a plurality of suggestion data sources.

FIG. 4 illustrates an exemplary system 400 that provides text suggestions for one or more user devices and applications executing on mobile or other devices. Referring to FIG. 4, a first mobile device 402 and a second mobile device 412 are in communication with a suggestion server 430 through suggestion interfaces 406 and 426. The first mobile device 402 includes a display 404 that includes a display area 408 associated with user data inputs and a display area 410 configured for presentation of suggestions received from the suggestion server 430. As shown in FIG. 4, the mobile device 402 is executing a client application for which a user is in the process of entering a URL 405 in the display area 408 and a URL suggestion is displayed in the display area 410. For typical touch screen based devices, a suggestion can be accepted by the user by tapping the corresponding display area. The suggestion can be obtained from the suggestion server 430, or by accessing user bookmarks and browsing history on the mobile device 402 or stored remotely.

A second mobile device 412 includes a display area 418 associated with user data inputs and display areas 420-422 configured for presentation of suggestions received from the suggestion server. The display areas 420-422 can be dedicated display areas or pop-up windows that are temporarily provided for display of suggestions. As shown in FIG. 4, the mobile device 412 is executing a client application for which a user is in the process of entering a sentence or phrase in the display area 418 and suggestion are displayed in the display areas 420-422. The phrase "I'm heading to" has been entered and an additional character "t" is entered via a keyboard 416 and added to the displayed phrase. Suggestions for completing the phrase are displayed in the display areas 420-422. For typical touch screens, a suggestion can be accepted by the user by tapping the corresponding display area.

The suggestion server 430 is in communication with suggestion data sources 450-452 that can be selected to provide suggestions as noted above. In addition to suggestion data, a search-based suggestion source is provided by a server 470 that is coupled to the suggestion server 430 and is configured to obtain URLs or other types of suggestions based on search results provided by an Internet-based search engine. Search engine-based suggestions can be ranked generally, or with reference to a particular user or user device.

Typically more or less complete suggestions can be provided, including portions of user data entry (such as characters) that are supplied to the suggestion server 430 as part of a suggestion query. However, if these portions are treated as being correct, they need not be returned in suggestions so that in response to a character "t" a suggestion "he" can be provided by the suggestion server 430 and displayed in combination with the local text character "t" as "the." Either the complete word or a portion thereof can be referred to as a suggestion. If, for example, a longer phrase such as "I'm heading t" is provided, the suggestion server can determine that some or all of the previously entered text could be modified and thus provide suggestions that do so.

Server based suggestions can be provided for a variety of client applications. For example, an email client can receive email address suggestions in an address field and text (word, phrase, and character) suggestions in a message field. Suggestion requests for email addresses can be communicated to a contact database at a network server. Email address suggestions can be displayed to a user by name instead of email address, and the suggestion server can provide both. A contact database can be configured for access by a single user, or access can be shared with a plurality of users. Customized suggestion lists, suggestions, and suggestion sources can be included, and access to such can be granted, denied, or otherwise controlled by a user so that they can be shared or remain private.

Figure 5:
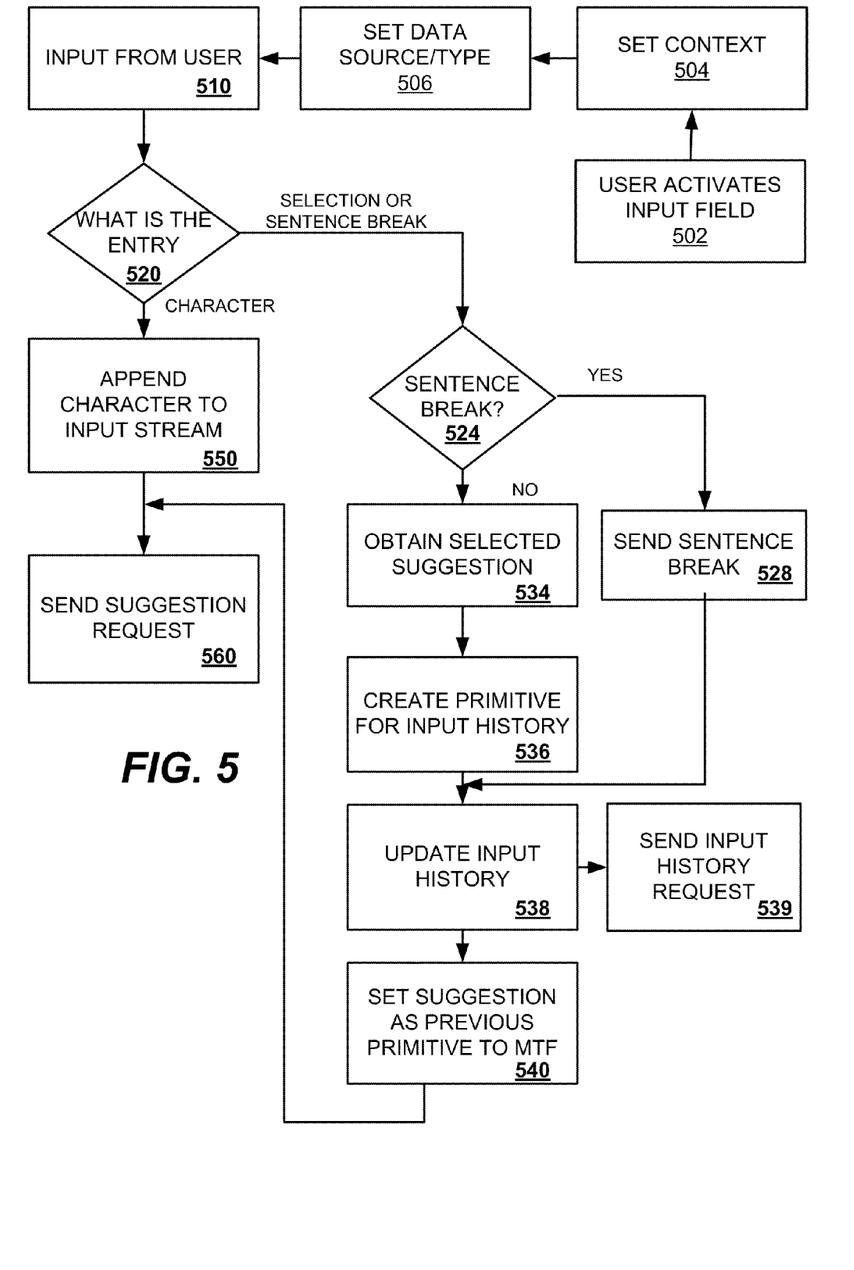
FIG. 5 is a block diagram illustrating a representative method of requesting suggestions.

Representative operation of the suggestion process is illustrated in FIG. 5. With reference to FIG. 5, a user activates an input field in an application in a step 502. The input field can be associated with entry of plain or formatted text, email addresses, URLs, sounds, images, other inputs. Upon activation of the input field, a context is set in a step 504 and data source and data type (if not previously set) are established in a step 506. User input to a client application in the input field (for example, a single character entered from a keyboard) is received in a step 510. In a step 520, the client application characterizes the received input. If a character is entered, in a step 550 the character is appended to an input stream and a suggestion request is forwarded in a step 560. If the entered input is a selection of a previous suggestion (for example, accepting a suggested word) or completes a previous partial entry (such as finishing a word or indicating that a sentenced has been completed by entering a period), the entered input is characterized in a step 524. If a completed sentence (a sentence break) is identified, in a step 528, the completed sentence can be forwarded for use as a basis for a subsequent suggestion in as step 540. Alternatively, suggestion queries can be supplied without reference to the completed sentence. If a suggestion has been accepted, the accepted suggestion can be obtained in a step 534 and in a step 536 the accepted suggestion can be added to an accepted suggestion history. In a step 538-539, the updated suggestion history is forwarded to a suggestion manager or a selected suggestion data source. In the step 540, an accepted suggestion (or multiples accepted suggestions from the history) is established as a basis for subsequent suggestions and forwarded in a step 560. An addition, for text or character entry, a history can be configured to store frequent user typing errors or patterns, so that corresponding suggestions can be provided.

A history of previously accepted suggestions can provide a basis for subsequent suggestions. Words, characters, character strings, or other suggestion portions in one or more entries in the history can be forwarded to obtain suggestions. Such a history can be generated locally or remotely and stored remotely or locally at a client device for use in forming suggestions, and one or more history entries can be discarded or additional entries added by a user. Additionally, in other embodiments, a history of previously entered text can provide a basis for suggestions. For example, a user can select a misspelled word in a sentence for editing and suggestions based on a history of entered text and words previous and subsequent to the selected word can be used to generate a correctly spelled suggestion.

Figure 6:
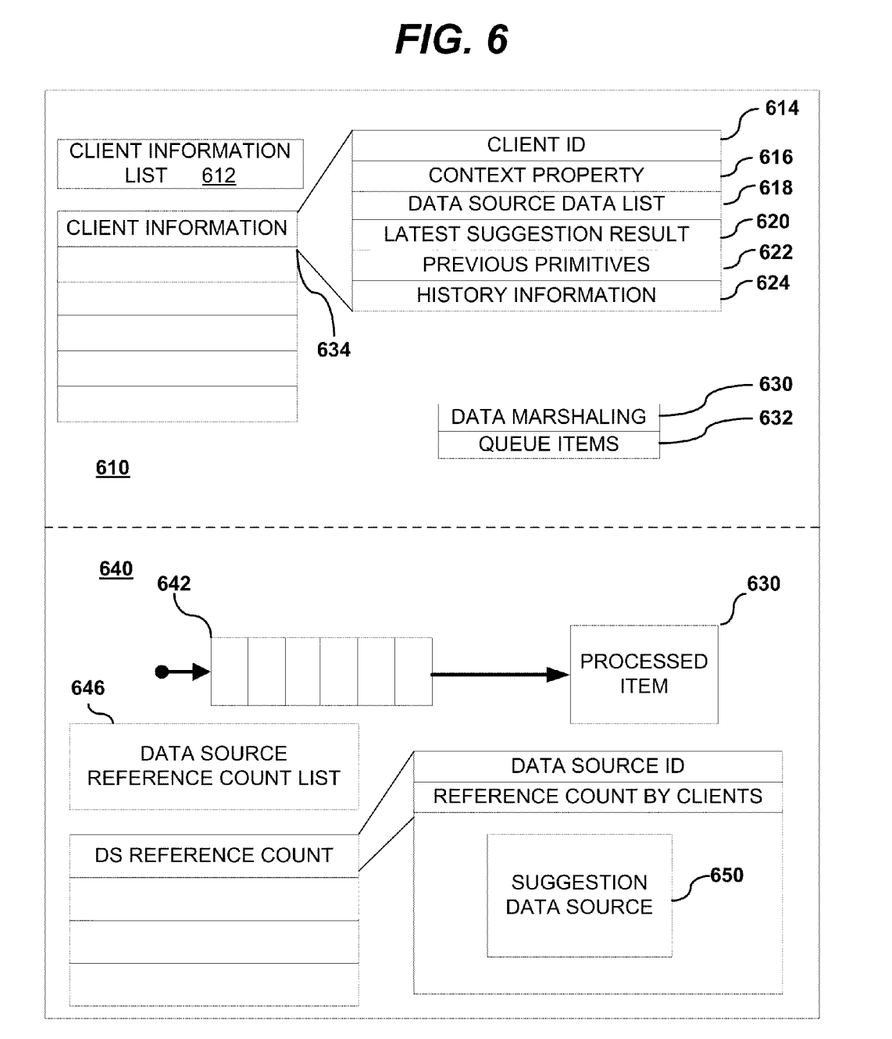
FIG. 6 illustrates suggestion processing based on client information for a plurality of clients.

FIG. 6 illustrates a representative method of providing suggestions from a network suggestion manager 610. A client information list 612 stores information about a plurality of clients. Such information can include a client ID 614, a client context 616, a data source list 618, latest or recent suggestion results 620, previous primitives 622, and suggestion or data source histories 624. Based on the stored client information, the suggestion manager 610 can process suggestion requests from clients by formatting and customizing suggestion requests for forwarding to one or more data sources. Typically, the suggestion manager 610 includes a data marshalling process 630 that can retrieve completed suggestion lists and a queue process 632 that controls the delivery of new requests, incremental requests, or cancellation requests to a suggestion director 640. The queue process 632 can set context properties for a client, select a list of data sources for a client, forward requests for one or more suggestions based on a client request, manage history data for a data source based on client context properties, or release cached client information in the service.

As shown in FIG. 6, the suggestion director 640 includes a request queue 642 and a data source reference count list 646 that stored data source reference counts for a plurality of data sources that can be selected to receive suggestion requests. Each data source such as a data source 650 can be associated with a unique data source ID. Requests received at the request queue 642 are processed so as to provide a request to data source in an order received, or in priority order based on clients, client IDs or other parameters. If a suggestion request is an incremental request, queued requests are searched based on client identifier to identify a request to be updated. Once found and updated, a message can be communicated indicating a successful request update. Receipt of an incremental request can also be associated with termination of the earlier request (i.e., the request prior to updating) as well as any prior suggestion results. Such processing can be based on setting values for one or more flags that can indicate how incremental requests and prior requests are to be treated.

Upon forwarding requests to data sources, the associated request can be removed from the request queue 642 and set as a current request. This process of removing requests from the queue and setting a request as current continues until the request queue is empty. As each request become current, client information 634 associated with the client identifier 636 of the request can be checked to determine if the client context property 640 should be updated. If additional requests from the client are not being serviced, the client can be removed from the client information list 612.

Figure 10:
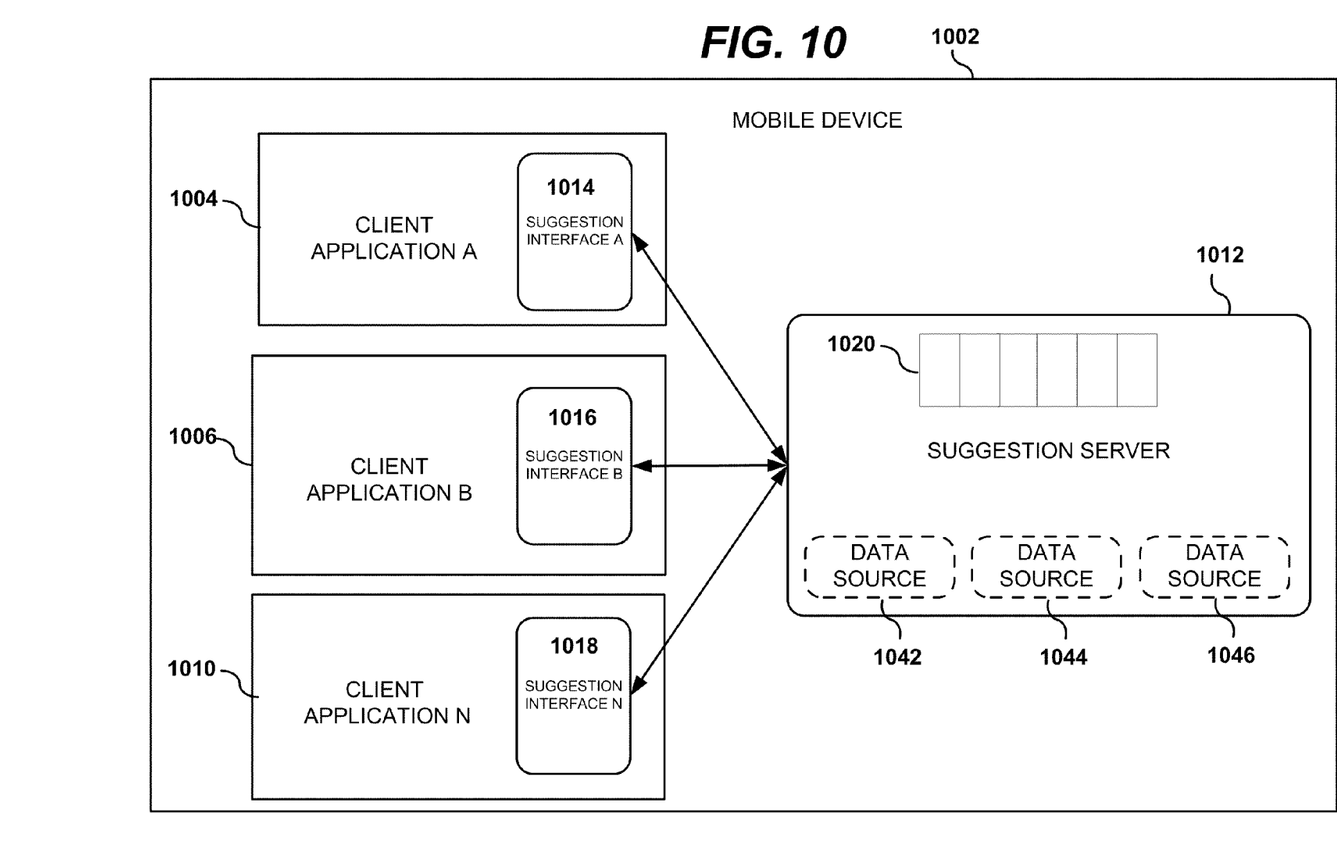
FIG. 10 illustrates an exemplary mobile device that uses a local suggestion server to provide text suggestions to multiple client applications on the mobile device.

FIG. 10 illustrates an exemplary mobile device 1002 that uses a suggestion server 1012 to provide text suggestions to multiple client applications 1004, 1006, 1010 on the mobile device 1002. The exemplary embodiment of FIG. 10 separates out the text suggestion service, as a server, from the client applications and illustrates how inter-process communication can be used to distribute the text suggestion service to each client application running on a single device. Referring to FIG. 10, the mobile device 1002 hosts the client applications 1004, 1006, 1010 that are in communication with the suggestion server 1012 through suggestion interfaces 1014, 1016, 1018. The suggestion interfaces 1014, 1016, 1018 communicate suggestion requests for the client applications and manage data to be passed to the suggestion server 1012. Suggestion requests received from the client applications at suggestion server 1012 are queued in a request queue 1020 which allows the suggestion server 1020 to manage multiple suggestion requests. The suggestion server 1012 hosts suggestion data sources 1042, 1044, and 1046 that can be selected by the client applications 1004, 1006, 1010 to provide requested suggestions. When the selected data sources provide suggestions, the suggestion server combines the suggestions into a list and communicates them to their respective client applications via the application interfaces.

Figure 7:
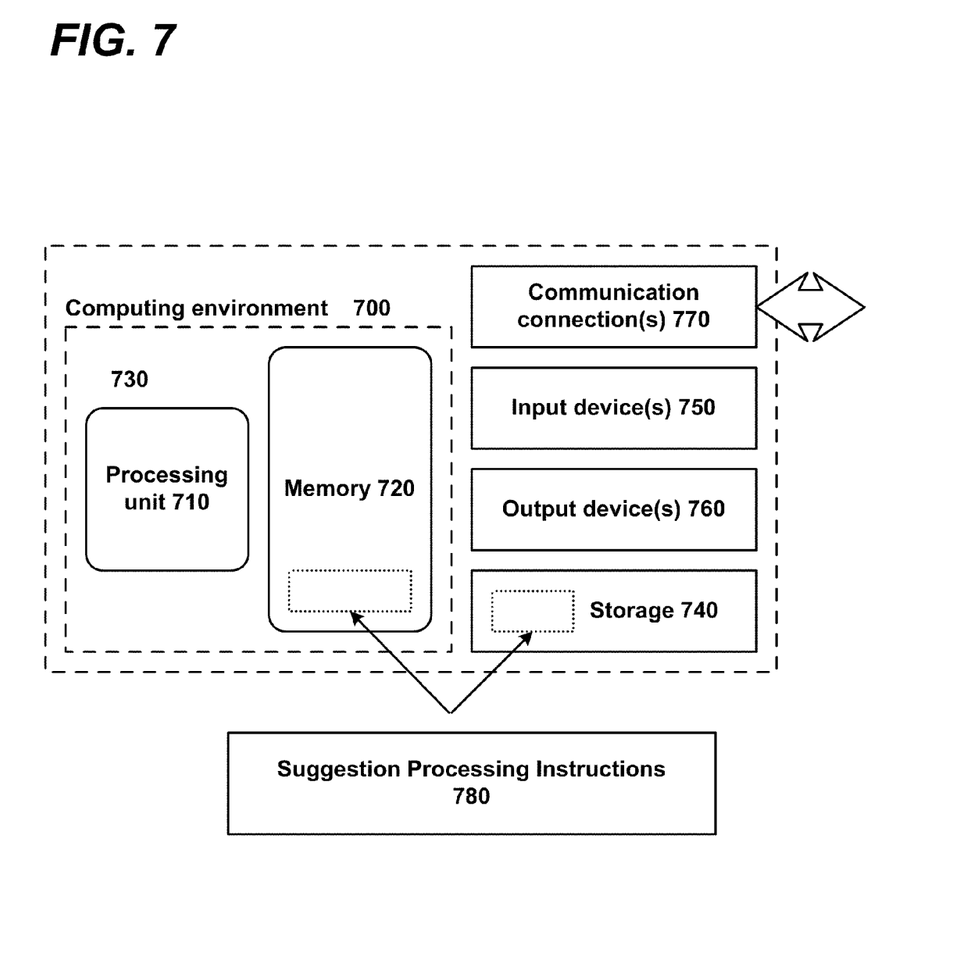
FIG. 7 illustrates a generalized example of a suitable computing environment for implementing a server-based suggestion system.

FIG. 7 illustrates a generalized example of a suitable computing environment 700 in which described embodiments, techniques, and technologies may be implemented. For example, the computing environment 700 can be one of the computing devices (e.g., a mobile device) used to implement the pointer tool 730. The computing environment 700 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 7, the computing environment 700 includes at least one central processing unit 710 and memory 720. In FIG. 7, this most basic configuration 730 is included within a dashed line. The central processing unit 710 executes computer-executable instructions and may be a real or a virtual processor. In a multi-processing system, multiple processing units execute computer-executable instructions to increase processing power and as such, multiple processors can be running simultaneously. The memory 720 may be volatile memory (e.g., registers, cache, RAM), non-volatile memory (e.g., ROM, EEPROM, flash memory, etc.), or some combination of the two. The memory 720 stores software 790 that can, for example, implement the technologies described herein. A computing environment may have additional features. For example, the computing environment 700 includes storage 740, one or more input devices 750, one or more output devices 760, and one or more communication connections 770. An interconnection mechanism (not shown) such as a bus, a controller, or a network, interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, CD-RWs, DVDs, or any other medium which can be used to store information and which can be accessed within the computing environment 700. The storage 740 stores computer-executable instructions 780 for network based suggestion services as described herein, such as a suggestion client.

The input device(s) 750 may be a touch input device, such as a keyboard, keypad, mouse, pen, or trackball, a voice input device, a scanning device, or another device, that provides input to the computing environment 700. The environment may also have a touch screen 780 as an input device and display. For audio, the input device(s) 750 may be a sound card or similar device that accepts audio input in analog or digital form, or a CD-ROM reader that provides audio samples to the computing environment 700. The output device(s) 760 may be a display, printer, speaker, CD-writer, or another device that provides output from the computing environment 700.

The communication connection(s) 770 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 700. By way of example, and not limitation, with the computing environment 700, computer-readable media include memory 720, storage 740, communication media (not shown), and combinations of any of the above.

Computer-readable media are any available media that can be accessed within a computing environment 700. By way of example, and not limitation, with the computing environment 700, computer-readable media include memory 720 and/or storage 740. As should be readily understood, the term computer-readable storage media includes the media for data storage such as memory 720 and storage 740, and not transmission media such as modulated data signals.

Figure 8:
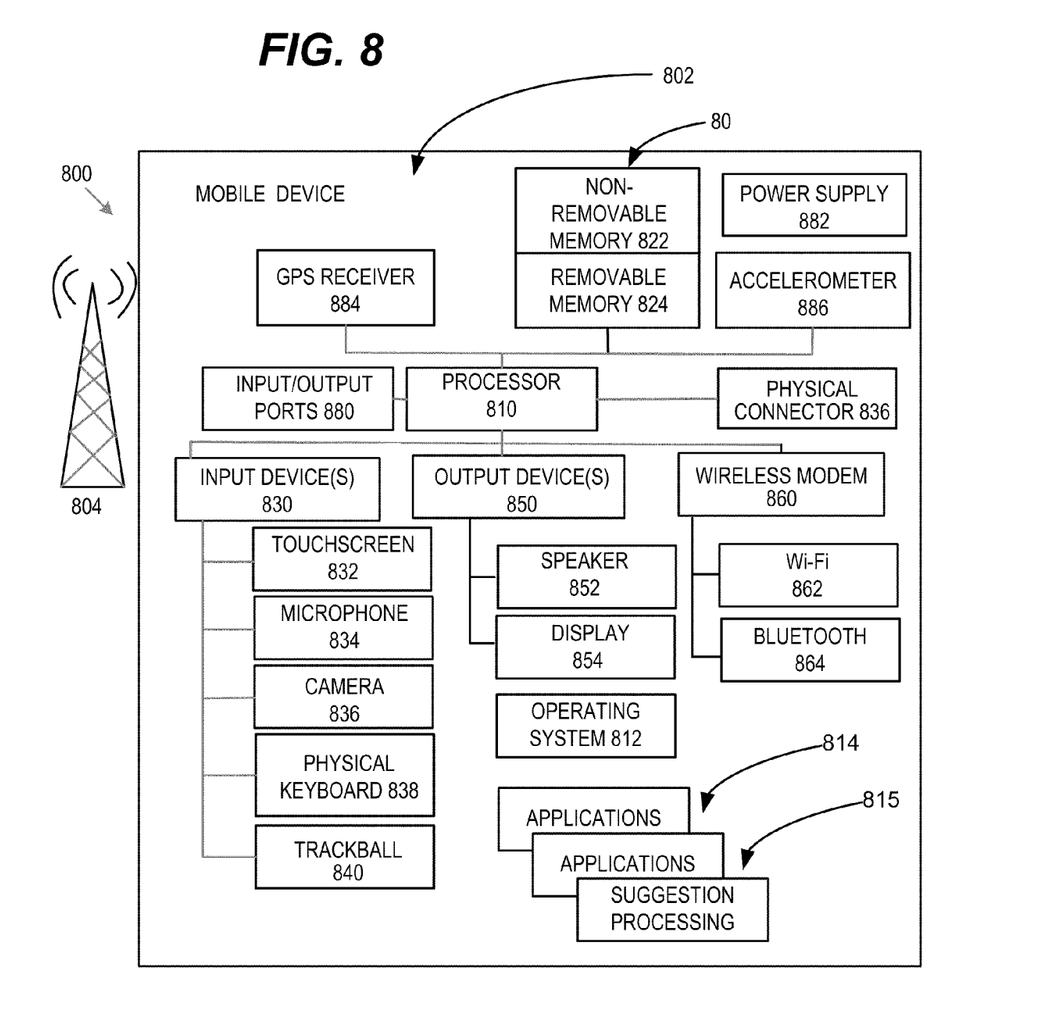
FIG. 8 is an exemplary mobile device that is configured to request suggestions from a local or remote suggestion system.

FIG. 8 is an exemplary mobile device 800 including a variety of optional hardware and software components, shown generally at 802. Any components 802 in the mobile device can communicate with any other component, although not all connections are shown, for ease of illustration. The mobile device can be any of a variety of computing devices (e.g., cell phone, handheld computer, Personal Digital Assistant (PDA), etc.) and can allow wireless two-way communications with one or more mobile communications networks 804, such as a cellular or satellite network. The illustrated mobile device can include a controller or processor 810 (e.g., signal processor, microprocessor, ASIC, or other control and processing logic circuitry) for performing such tasks as signal coding, data processing, input/output processing, power control, and/or other functions necessary for implementing the mobile device. An operating system 812 can control the allocation and usage of the components 802 and support for one or more application programs 814 as well as a suggestion processor client 815. The application programs typically include email applications, calendars, contact managers, web browsers, text and media messaging applications. Memory 820 can include non-removable memory 822 and/or removable memory 824. The non-removable memory 822 can include RAM, ROM, flash memory, a hard disk, or other well-known memory storage technologies and can be used for storing data and/or code for running the operating system 812 and the applications 814. Example data can include web pages, text, images, sound files, video data, or other data sets to and from one or more network servers or other mobile devices via one or more wired or wireless networks. The removable memory 824 can include flash memory or a Subscriber Identity Module (SIM) card, which is well known in GSM communication systems, or other well-known memory storage technologies, such as "smart cards." The memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The mobile device can support one or more input devices 830, such as a touch screen 832, microphone 834, camera 836, physical keyboard 838 and/or trackball 840 and one or more output devices 850, such as a speaker 852 and a display 854. Other possible output devices (not shown) can include piezoelectric or other haptic output devices. A wireless modem 860 can be coupled to an antenna (not shown) and can support two-way communications between the processor 810 and external devices, as is well understood in the art. The modem 860 is shown generically and can include a cellular modem for communicating with the mobile communication network 804 and/or other radio-based modems (e.g., Bluetooth or Wi-Fi). The wireless modem 860 is typically configured for communication with one or more cellular networks, such as a GSM network for data and voice communications within a single cellular network, between cellular networks, or between the mobile device and a public switched telephone network (PSSTN). The mobile device can further include at least one input/output port 880, a power supply 882, a satellite navigation system receiver 884, such as a Global Positioning System (GPS) receiver, an accelerometer 886, a transceiver 888 (for wirelessly transmitting analog or digital signals) and/or a physical connector 890, which can be a USB port, IEEE 1394 (firewall) port, and RS-232 port. The illustrated components 802 are not required or all-inclusive, as any components can deleted and other components can be added.

Figure 9:
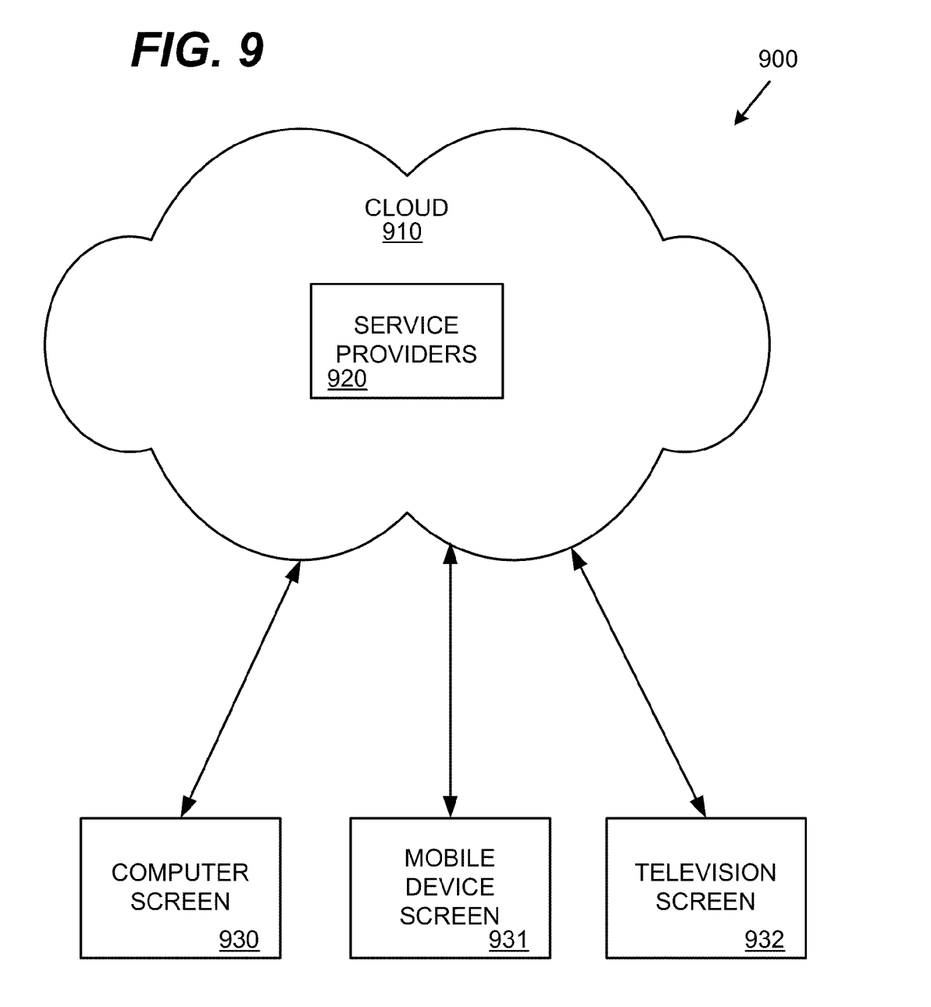
FIG. 9 illustrates a generalized example of a suitable implementation environment for network suggestion services for various user devices.

FIG. 9 illustrates a generalized example of a suitable implementation environment 900 in which described embodiments, techniques, and technologies may be implemented. In example environment 900, various types of services (e.g., computing services, including suggestion request processing, suggestion generation, suggestion storage and retrieval) are provided by a cloud 910. For example, the cloud 910 can comprise a collection of computing devices, which may be located centrally or distributed, that provide cloud-based services to various types of users and devices connected via a network such as the Internet.

In example environment 900, the cloud 910 provides services for connected devices 930-932 with a variety of screen capabilities. Connected device 930 represents a device with a computer screen (e.g., a mid-size screen). For example, connected device 930 can be a personal computer such as desktop computer, laptop, notebook, netbook, or the like. Connected device 931 represents a device with a mobile device screen (e.g., a small size screen). For example, connected device 931 can be a mobile phone, smart phone, personal digital assistant, tablet computer, and the like. Connected device 932 represents a device with a large screen. For example, connected device 932 can be a television screen (e.g., a smart television) or another device connected to a television (e.g., a set-top box or gaming console) or the like. One or more of the connected devices 930-932 can include touch screen capabilities.

Device properties can be included in a client context associated with suggestion request processing and forwarded to a suggestion manager or one or more suggestion providers for use in selecting appropriate suggestions, weighting suggestions, or comparing a suggestion request to other suggestion requests associated with a common client or user associated with a different connected device. In some examples, a user can access a common set of suggestions or have a common suggestion context at associated user devices, but suggestions and context properties weighted based on a device associated with a current request.

Services can be provided by the cloud 910 through service providers 920, or through other providers of online services (not depicted). For example, cloud services can be customized to the screen size, display capability, and/or touch screen capability of a particular connected device (e.g., connected devices 930-932).

In example environment 900, the cloud 910 provides the technologies and solutions described herein to the various connected devices 930-932 using, at least in part, the service providers 920. For example, the service providers 920 can provide a centralized solution for various cloud-based services (e.g., spelling data, grammar data, word frequency data, etc.). The service providers 920 can manage service subscriptions for users and/or devices (e.g., for the connected devices 930-932 and/or their respective users).

Any of the disclosed methods can be implemented as computer-executable instructions stored on one or more computer-readable media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed examples are intended to be illustrative and are not to be taken as limiting the scope of the disclosure. We claim all that is encompassed by the appended claims.

We claim:

1. A method, comprising:
  receiving a first client context comprising a first client identifier;
  receiving a plurality of suggestion requests, at least one of the received plurality of suggestion requests being associated with the first client identifier;
  queuing the plurality of suggestion requests;
  removing at least one of the plurality of suggestion requests from at least one queue in response to an associated incremental request;

based at least on the first client context, selecting at least one suggestion data source from a plurality of suggestion data sources responsive to the at least one of the received plurality of suggestion requests associated with the first client identifier;

forwarding the at least one of the received plurality of suggestion requests associated with the first client identifier to the at least one suggestion data source; and receiving at least one suggestion responsive to the forwarded request.

2. The method of claim 1, further comprising:
selecting two or more suggestion data sources from the plurality of suggestion data sources responsive to the at least one of the received plurality of suggestion requests associated with the first client identifier; and forwarding the at least one of the received plurality of suggestion requests associated with the first client identifier to the two or more suggestion data sources.

3. The method of claim 1, wherein the at least one suggestion data source is specified in the at least one of the received plurality of suggestion requests associated with the first client identifier.

4. The method of claim 1, further comprising:
receiving a plurality of suggestions in response to the forwarded at least one of the received plurality of suggestion requests, and ranking the suggestions based on a history of previously accepted suggestions.

5. The method of claim 1, wherein the plurality of suggestion requests is received at a server and communicated from a client application; and
wherein the client application, server, and suggestion data sources are on a single device.

6. The method of claim 1, wherein the at least one of the received requests associated with the first client identifier includes an indicator of a field type associated with the received request, wherein the field type indicator is associated with handwriting input, image input, sound input, voice input, or text input.

7. The method of claim 1, wherein the at least one of the received requests associated with the first client identifier includes an indicator of a text language, and the data source is selected based on the text language.

8. A mobile device, comprising:
a processor configured to:
execute a client application;
forward client context information for the client application;
forward a first suggestion request including an identifier associated with the client application;
queue the first suggestion request;
forward a second suggestion request including the identifier associated with the client application, the second suggestion request being an incremental request;
remove the first suggestion request from at least one queue in response to the forwarded second suggestion request including the identifier associated with the client application; and
receive at least one suggestion generated at one or more suggestion data sources selected based on the client context information and the second suggestion request including the identifier associated with the client application.

9. The mobile device of claim 8, wherein the processor is configured to forward data source identifiers associated with a plurality of suggestion sources.

10. The mobile device of claim 8, wherein the processor is configured to forward data weights associated with the suggestion sources.

11. The mobile device of claim 8, wherein the processor is configured to forward an input field type indicator associated with the second suggestion request.

12. The mobile device of claim 8, wherein the processor is configured to provide the at least one suggestion to the client application.

13. The mobile device of claim 8, wherein the processor is configured to forward at least one of a maximum number of requested candidate suggestions and a request duration associated with the second suggestion request.

14. The mobile device of claim 8, wherein the processor is configured to forward a suggestion combination mode indicator, wherein the suggestion combination mode indicator specifies that suggestions from multiple suggestion sources are to be delivered as a merge list, a concatenated list, or as generated.

15. The mobile device of claim 8, wherein the processor is configured to forward a language identifier associated with the second suggestion request.

16. A method performed on a mobile device, the method comprising:
communicating, from a first client application, a first client context including an identifier associated with the first client application;
communicating, from a second client application, a second client context including an identifier associated with the second client application;
communicating, from the first client application, a first suggestion request including an identifier associated with the first client application;
communicating, from the second client application, a second suggestion request including an identifier associated with the second client application;
queuing the first and second suggestion requests in a request queue;
based on the first client context, selecting at least one suggestion data source responsive to the first suggestion request;
receiving at least one suggestion from the at least one suggestion data source based on the first suggestion request;
removing at least one suggestion request from the request queue in response to an associated incremental request, the incremental request comprising an indication that the request is incremental to the associated at least one suggestion request; and
receiving, at the first client application, the at least one suggestion.

17. The method of claim 16, further comprising:
generating a plurality of suggestions at two or more suggestion data sources based on the first suggestion request and, wherein the first client context comprises a combination mode indicator, wherein the combination mode indicator specifies that the generated suggestions from the two or more data sources are to be delivered as a merge list, a concatenated list, or individually as generated; and
receiving, at the first client application, the plurality of suggestions according to the client context.

* * * * *